(12) United States Patent
Yeh et al.

(10) Patent No.: US 6,982,831 B2
(45) Date of Patent: Jan. 3, 2006

(54) ATHERMAL BIREFRINGENT OPTICAL INTERLEAVERS WITH FLAT-TOP PASSBANDS

(75) Inventors: Pochi Albert Yeh, Thousand Oaks, CA (US); Zhiling Xu, Camarillo, CA (US)

(73) Assignee: Oplink Communications, Inc., Fremont, CA (US)

( * ) Notice: Subject to any disclaimer, the term of this patent is extended or adjusted under 35 U.S.C. 154(b) by 214 days.

(21) Appl. No.: 10/214,235

(22) Filed: Aug. 7, 2002

(65) Prior Publication Data

US 2003/0035212 A1   Feb. 20, 2003

Related U.S. Application Data

(60) Provisional application No. 60/311,674, filed on Aug. 8, 2001.

(51) Int. Cl.
*G02B 27/28* (2006.01)
*G02B 5/30* (2006.01)

(52) U.S. Cl. .............. 359/498; 359/494; 359/497; 385/24

(58) Field of Classification Search ............ 359/115, 359/124, 578, 494–499; 385/24; 398/79, 398/86
See application file for complete search history.

(56) References Cited

U.S. PATENT DOCUMENTS

| | | | |
|---|---|---|---|
| 6,075,647 A * | 6/2000 | Braun et al. | 359/578 |
| 6,243,200 B1 * | 6/2001 | Zhou et al. | 359/497 |
| 6,697,198 B2 * | 2/2004 | Tai et al. | 359/498 |
| 6,804,429 B2 * | 10/2004 | Yu et al. | 385/24 |
| 2002/0171908 A1 * | 11/2002 | Copner et al. | 359/278 |
| 2004/0141685 A1 * | 7/2004 | Zhou et al. | 385/24 |

* cited by examiner

*Primary Examiner*—Leonidas Boutsikaris
(74) *Attorney, Agent, or Firm*—Scot A. Reader, Esq.

(57) ABSTRACT

A spectral interleaver providing flat top spectral transmission passbands and athermal operation is disclosed. The spectral interleaver may comprise a pentagon-shaped birefringent crystal, a polarization beam splitter, and a dielectric mirror at one facet of the crystal. Prisms and polarizing beam splitters can be employed for operation with an unpolarized input beam. The cavity formed by the mirror and the crystal serves as a spectrally dispersive mirror. Front mirror reflectivity is provided by the air-crystal (or other medium-crystal) interface. Proper mirror reflectivities can be achieved by selecting the angle $\theta$ of the pentagon-shape crystal. By selecting the proper air space between the mirror and the crystal surface and the crystal length, the interleaver can have a flat top transmission function. A combination of two different crystals which exhibit different thermal-optic effects may be employed such that the total phase retardation is independent of the temperature, leading to athermal operation.

14 Claims, 4 Drawing Sheets

ATHERMAL BIREFRINGENT OPTICAL INTERLEAVERS WITH FLAT-TOP PASSBANDS

CROSS-REFERENCE TO RELATED APPLICATION

Embodiments of the present invention claim priority from U.S. provisional patent application Ser. No. 60/311,674, entitled "Athermal Birefringent Optical Interleavers With Flat-Top Passbands," filed Aug. 8, 2001, the contents of which is incorporated herein by reference for all purposes.

BACKGROUND OF THE INVENTION

1. Field of the Invention

The present invention relates, generally, to spectral interleavers and, in preferred embodiments, to devices and methods for producing athermal birefringent optical interleavers with flat-top passbands.

2. Description of Related Art

Spectral interleavers are important devices for applications in Dense Wavelength Division Multiplexing (DWDM) optical communication networks. Conventional interleavers are made of optical interferometers which employ a beam splitter (BS) to split the input beam in two. These two beams are then recombined at the beam splitter using two mirrors to provide the retro-reflection. The interferometers can be Michelson interferometers, Mach-Zehnder interferometers, or birefringent interferometers. When a path length difference exists between the two interfering beams, these conventional interleavers provide a sinusoidal spectral transmission function. Under the appropriate conditions, the transmission maxima and minima can be tuned to match the International Telecommunications Union (ITU) frequency channels. Thus, such interferometers can be employed as spectral interleavers for DWDM applications. An interleaver can separate a set of multiplexed frequency channels into two subsets with mutually interleaving frequency channels in each set. However, when a significant signal bandwidth exists in each of the channels, the sinusoidal transmission function can lead to signal loss and distortion. A desirable interleaver should provide a flat top spectral transmission passband for each of the ITU frequency channels.

However, the performance of most conventional interleavers is either inadequate in terms of passband flatness and stopband isolation, or sensitive to external temperature change.

SUMMARY OF THE DISCLOSURE

It is an advantage of embodiments of the present invention to provide a spectral interleaver which can provide flat-top spectral transmission passbands via the use of a single optical cavity formed by a mirror and crystal surface for DWDM applications, as well as athermal operation with performance independent of the external temperature.

It is a further advantage of embodiments of the present invention to provide a spectral interleaver having a common optical path length for interference via the use of birefringent crystals, wherein optimum reflectivities are obtained without thin film coatings. A spectral interleaver with a common optical path means that the two interference beams occupy the same physical path. Typically, in other interleavers the two interference beams propagate in different arms (different physical paths).

The spectral interleaver according to embodiments of the present invention comprises a certain shape (for example, pentagon-shaped) birefringent crystal, a polarization beam splitter, and a metal or dielectric mirror at one facet of the crystal. Prisms and polarizing beam splitter combinations can be employed for operation with an unpolarized input beam. The cavity formed by the mirror and the crystal serves as a spectrally dispersive mirror in the birefringent interferometer. The medium of the cavity can be composed of air, or alternatively, other gases or other materials. The optical cavity length can be tuned by choosing proper gas mixtures or other materials. In this cavity, the front mirror reflectivity is provided by the air-crystal (or other medium-crystal) interface. Additional coating may be added to improve the performance, if needed.

In the design of interleavers using Michelson interferometers or Gires-Tournois Interferometers (GTIs), the front mirrors of the cavities must have reflectivities in the range of about 2–10% for one and about 30–60% for the other. In embodiments of the present invention, these mirror reflectivities can be achieved by properly selecting the angle $\theta$ of the pentagon-shape crystal. When the angle is near the Brewster angle, the reflectivity of the p-polarization component can be made near the optimum value in the range of about 2–10%, whereas the reflectivity of the s-polarization component can be made near the optimum value within the range of about 30–60%. By selecting the proper air space between the mirror and the crystal surface and the crystal length, it is possible to achieve an interleaver with a flat top transmission function.

Furthermore, a combination of two different crystals that exhibit different thermal-optic effects may be employed in such a way that the total phase retardation is independent of the temperature, which can lead to athermal operation.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
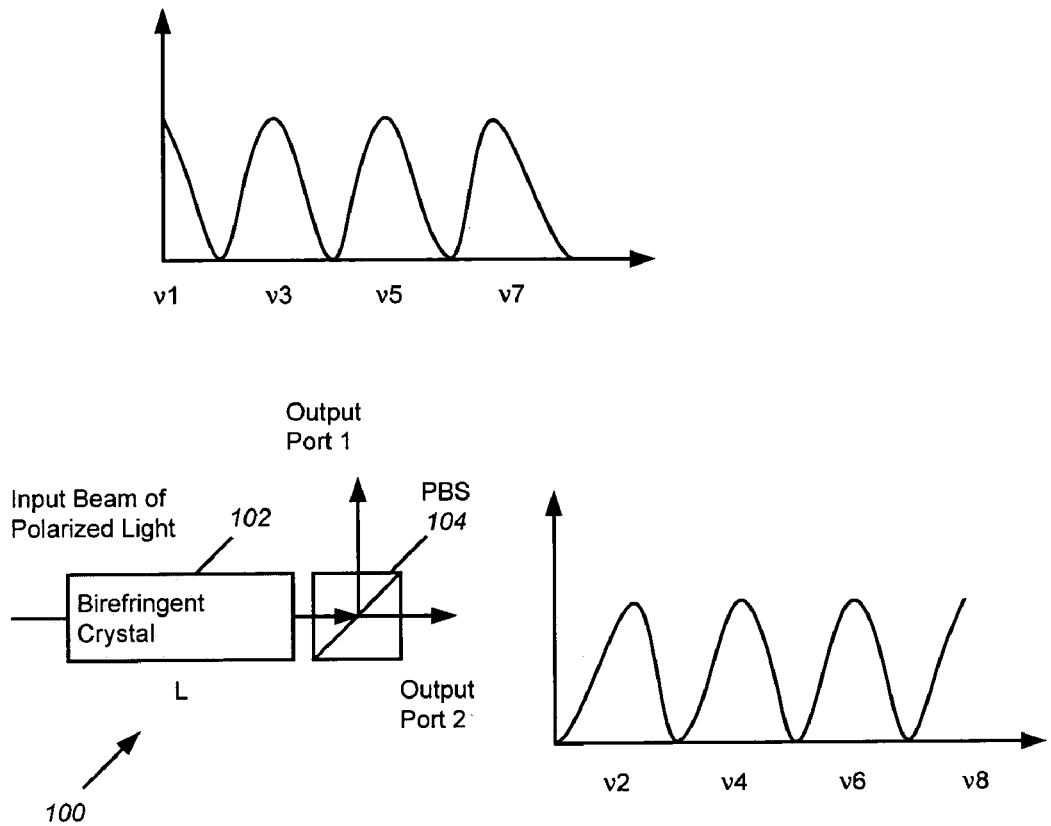
FIG. 1 is a block diagram and graph illustrating a conventional birefringent optical interferometer and its resultant outputs.

FIG. 1 illustrates a conventional birefringent interferometer 100 which comprises a plate of birefringent crystal 102 and a polarizing beam splitter (PBS) 104. Generally speaking, in a birefringent crystal, different modes of light propagate at different speeds, and thus have different phase retardation. The c-axis of the crystal (in FIG. 1, the c-axis is perpendicular to the light beam and is 45 degrees from the paper surface) is oriented in such a way that a beam of polarized light can excite two modes of propagation in the crystal with equal intensity. In uniaxial crystals, these two modes are the ordinary and extraordinary modes.

In such a conventional birefringent optical interferometer 100, the intensity of one of the output ports (depending on the orientation of the crystal) is a sinusoidal function of frequency. Specifically, the intensity can be written as $$I = \frac{1}{2}\left\{1 + \cos\left[\frac{2\pi}{c}v(n_e - n_o)L\right]\right\}, \quad (1)$$

where L is the physical path length inside the crystal, v is the optical frequency, and $n_e$ and $n_o$ are the extraordinary and ordinary refractive indices of the crystal, respectively. Note that the intensity is a sinusoidal function of the optical frequency with transmission maxima occurring at $$v = m\frac{c}{(n_e - n_o)L}, \quad (2)$$

wherein m is an integer. The spectral separation between the maxima is given by $$Period_{Crystal} = \frac{c}{(n_e - n_o)L}. \quad (3)$$

For example, in a DWDM transmission with 100 GHz channel spacing, a crystal thickness L can be selected such that the period is 200 GHz, and after the interleaver, the channel spacing becomes 200 GHz. Using YVO4 crystal with a index difference of $\Delta n = n_e - n_o = 0.2$, a crystal thickness of 0.75 cm is obtained. For DWDM systems with 25 GHz channel spacing, the crystal length needed is 3.0 cm.

Figure 2:
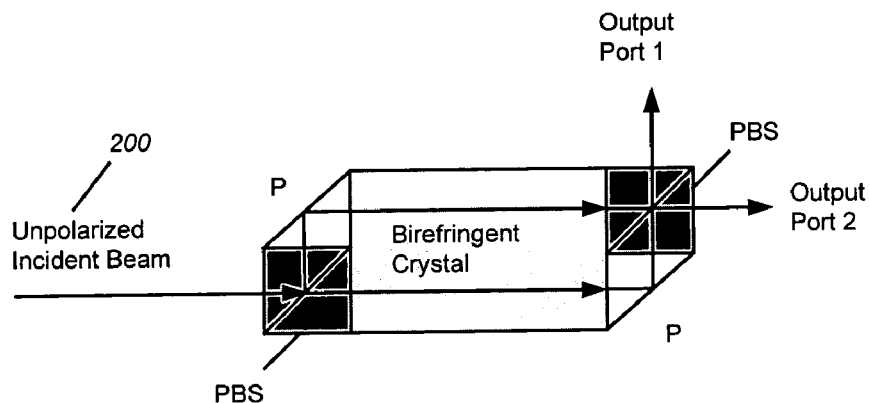
FIG. 2 is a block diagram illustrating a conventional birefringent optical interferometer for an unpolarized beam of input light.

The basic idea described above is for a polarized beam of input light only. FIG. 2 shows an approach to accommodate an unpolarized beam of input light 200 using a combination of prisms and polarizing beam splitters.

Figure 3:
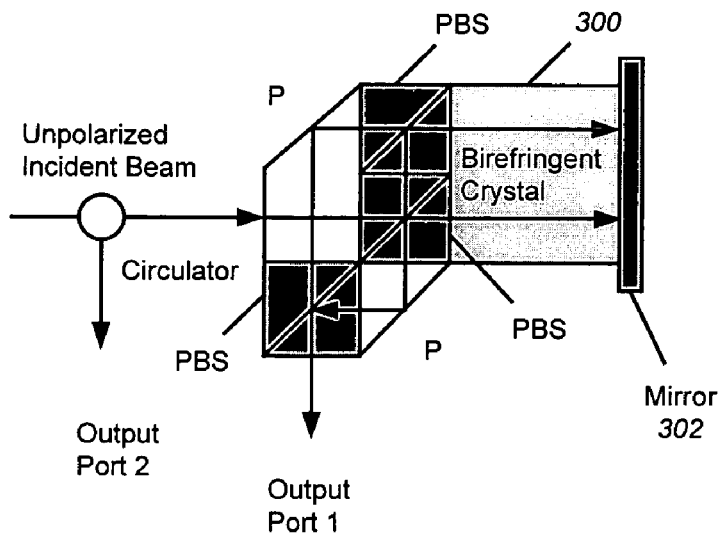
FIG. 3 is a block diagram illustrating a conventional birefringent optical interferometer for an unpolarized beam of input light using mirrors to create a folded beam path.

As illustrated in FIG. 3, by folding the beam path inside a crystal 300 (e.g., by using a mirror or several mirrors), it is possible to achieve the same performance with a shorter crystal length. FIG. 3 shows an example using a mirror 302. The circulator is employed to facilitate the access of the output beam. Without a circulator, the output beam will retrace the input beam path and thus becomes inaccessible.

The sinusoidal transmission peaks provided by the interleavers shown in FIGS. 1 and 2 are not very desirable for practical operations. To accommodate a slight drift of the carrier frequency, it is desirable to have a flat-top passband as provided in embodiments of the present invention.

Figure 4:
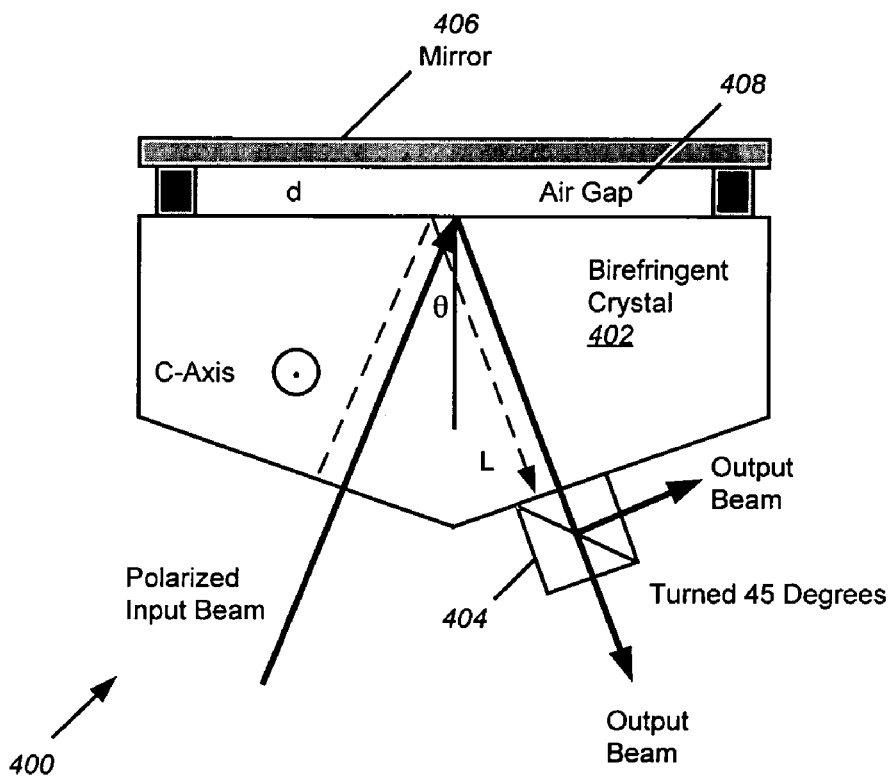
FIG. 4 is a block diagram illustrating a birefringent interleaver with flat-top passbands according to an embodiment of the present invention.

FIG. 4 illustrates a novel birefringent interleaver 400 which comprises a pentagon-shape birefringent crystal 402, a polarization beam splitter (PBS) 404, and a mirror (dielectric or metallic) 406 at one facet of the crystal according to an embodiment of the present invention. A single optical cavity (spacer region) 408 is formed by the mirror and the crystal surface. Although a pentagon-shape crystal is used as an example, crystals of different shapes may also be used, including triangular, polygonal, and the like. The important characteristic of the crystal shape is that it must have two surfaces which allow the input beam and output beam to exit perpendicular to those two surfaces, and must have a third surface which acts as a front mirror to reflect the beam at an angle θ' with respect to a line perpendicular to the third surface. The mirror 406 (the back mirror) is positioned at a small distance d from the crystal surface. In embodiments of the present invention, the cavity 408 formed by the mirror and the crystal surface serves as a spectrally dispersive mirror. The phase dispersion is a periodic function of frequency with a period of $$Period = c/(2d \cos θ'), \quad (4)$$

where θ' is the incidence angle.

In embodiments of the present invention, the air gap d may be chosen so that the period corresponds to the channel spacing. In this cavity, the front mirror reflectivity is provided by the air-crystal interface. In alternative embodiments, additional coatings may be added to improve the performance. In one embodiment of the present invention, optimum reflectivities may be obtained without thin film coatings. However, because Fresnel reflectivity at the crystal-air interface may not produce these ranges, in alternative embodiments the application of coatings well-understood by those skilled in the art may be needed.

In interleavers designed using Michelson interferometers, the front mirrors of the cavities may have reflectivities in the range of about 2–10%, and the back mirrors may have reflectivities in the range of about 30–60%. In embodiments of the present invention, these mirror reflectivities can be achieved by properly selecting the angle θ' of the pentagon-shape crystal according to well-known principles. For example, when the angle θ' is near the Brewster angle, the reflectivity of the p-polarization component can be made near the optimum value in the range of about 2–10%, whereas the reflectivity of the s-polarization component can be made near the optimum value within the range of about 30–60%. Note that the s-polarization component in FIG. 4 is parallel to c-axis, while the p-polarization component is perpendicular to both the c-axis and input beam.

By selecting the proper air space inside the cavity d and the physical path length L, it is possible to achieve an interleaver with a flat top transmission function (or other desirable shapes/profiles). The spacing d between the mirror and the crystal surface is a design parameter related to the dimensions of the crystal. For improved performance, the crystal dimension L may be chosen to satisfy the equation $\Delta nL = d \cos θ'$, where d is the air gap, θ' is the incidence angle in the air, and $\Delta n$ is the birefringence $(n_e - n_o)$ of the crystal. Note that L is the total distance the beam travels through the crystal, not including the air gap.

In the particular embodiment of the present invention shown in FIG. 4, the c-axis of the crystal is oriented perpendicular to the plane of incidence. In this case, the PBS 404 must be oriented at about 45 degrees with respect to the c-axis to ensure the proper operation of the interleaver with improved isolation. The 45-degree orientation ensures the ultimate contrast of one to zero in the interference.

For example, in a DWDM system with a channel spacing of 100 GHz, an air space of about $d \cos \theta' = 1.5$ mm is needed. This requires a physical path L of about 3.0 mm/$\Delta n$, where $\Delta n$ is the birefringence ($n_e - n_o$) of the crystal. For YVO4 crystals, the length L will be about 15 mm.

As a result of the cavity formed by the mirror and the crystal surface as shown in FIG. 4, the intensity of one of the output ports becomes $$I = \frac{1}{2}\left\{1 + \cos\left[\frac{2\pi}{c}v(n_e - n_o)L + \phi_e - \phi_o\right]\right\}, \quad (5)$$

where $\phi_e$ and $\phi_o$ are the phase shifts of the beam upon reflection from the cavity. The subscripts indicate the mode inside the crystal, i.e. the extraordinary beam and ordinary beam. The phase shifts can be written $$\phi_e - \phi_o = 2\tan^{-1}\left(\frac{1+\sqrt{R_e}}{1-\sqrt{R_e}}\tan\frac{2\pi}{c}vd\cos\theta'\right) - \quad (6)$$

$$2\tan^{-1}\left(\frac{1+\sqrt{R_o}}{1-\sqrt{R_o}}\tan\frac{2\pi}{c}vd\cos\theta'\right),$$

where d is the air space inside the cavity, $\theta'$ is the incidence angle, $R_e$ is the reflectivity of the air-crystal interface for the e-component, and $R_o$ is the reflectivity of the air-crystal interface for the o-component (ordinary beam). In the particular crystal cut shown in FIG. 4, the e-component (extraordinary beam) is the s-polarized wave, whereas the o-component is the p-polarized wave. These two components can have quite different reflectivities from the air-crystal interface. By choosing the angle $\theta'$ near the Brewster angle, optimum interface reflectivities $R_e$ and $R_o$ can be obtained such that the intensity (Equation (5)) exhibits a flat-top passband over a range of optical frequencies.

Note that the phase shift ($\phi_e - \phi_o$) varies from zero to $2\pi$ and is a periodic function of frequency with a period of $$Period_{Cavity} = \frac{c}{2d\cos\theta'}, \quad (7)$$

A proper relationship between the air space of the cavity d and the path length L inside the crystal is needed to ensure a desirable transmission function. By comparing the expressions for the periods, note that the physical path length inside the crystal is related to the air gap by the following equation, $$2d \cos \theta' = (n_e - n_o)L. \quad (8)$$

For a DWDM system with a channel spacing of 100 GHz, d may be chosen to be about 1.5 mm/$\cos \theta'$. The physical path length L may be chosen to be about 3.0 mm/$\Delta n$. For $\Delta n = 0.2$ (e.g., YVO4), the physical path length L may be chosen to be about 15 mm.

The particular embodiment of the present invention shown in FIG. 4 is for a polarized beam of input light with an orientation of about 45 degrees relative to the c-axis of the crystal. This ensures the excitation of both modes with equal intensity. Prisms and polarizing beam splitters (PBS) may be employed (as shown in FIG. 3) for operation with an unpolarized beam of input light.

Figure 5:
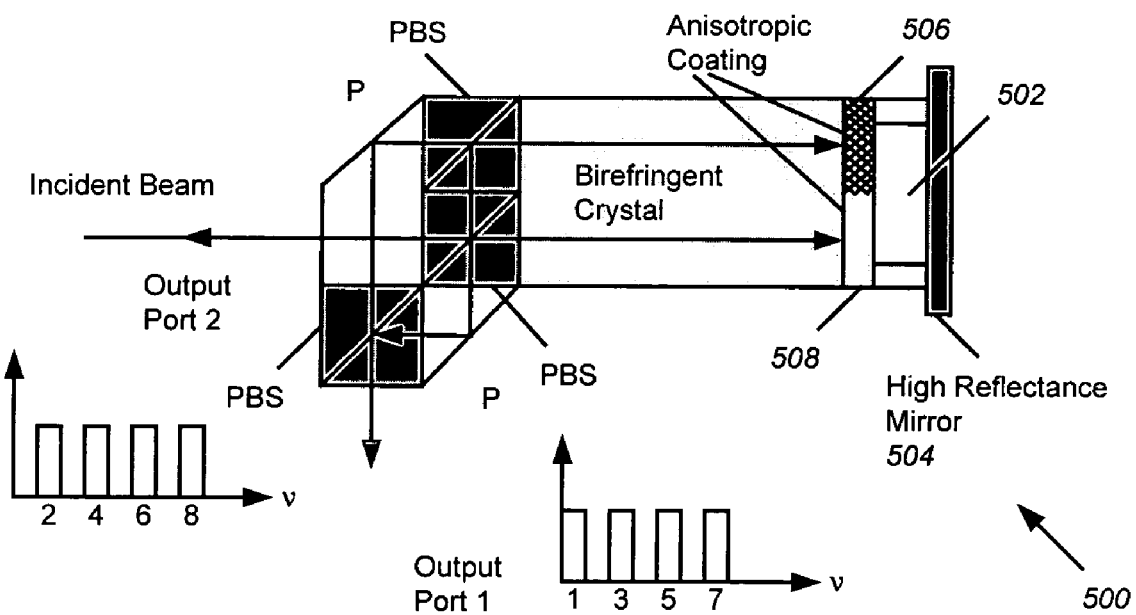
FIG. 5 is a block diagram and graph illustrating a birefringent interleaver with flat-top passbands utilizing a dual GTI with an anisotropic coating according to an embodiment of the present invention.

A birefringent interleaver 500 with flat-top passbands according to another embodiment of the present invention can be achieved as shown in FIG. 5. In the embodiment of FIG. 5, a dual-GTI 502 is employed to replace the mirror shown in FIG. 3. The dual-GTI 502 includes a front mirror with two different anisotropic coatings 506 and 508 to provide the two reflectivities $R_e$ and $R_o$ needed for flat-top performance and a high reflectance mirror 504 at the end. Under the appropriate conditions (proper reflectivity ratio of the reflectivities of the front mirror), the dual-GTI 502 provides the phase dispersion needed for flat-top performance. According to Equation (6), the phase shift depends on mirror reflectivity. There are a range of the mirror reflectivities that can be used in interleavers, depending on the need for passband flatness, and the channel isolation. In one embodiment, the mirror reflectivity ranges are about 4–6% for one mirror and about 30–50% for the other.

Figure 6:
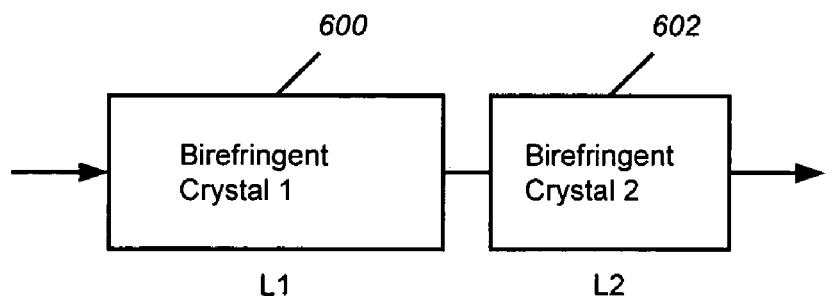
FIG. 6 is a block diagram illustrating a birefringent interleaver with flat-top passbands utilizing two crystals with different thermo-optical properties for athermal operation according to an embodiment of the present invention.

For most birefringent crystals, both the crystal length L and the birefringence ($n_e - n_o$) are dependent on temperature. This is generally undesirable, as temperature control is needed for proper operation. Embodiments of the present invention obtain athermal operation without the need for temperature control. As illustrated in FIG. 6, a combination of two crystals 600 and 602 with different thermo-optical properties may be employed. Under the appropriate length ratio, as explained in further detail below, the total phase retardation can be shown to be independent of the temperature. This leads to athermal operation of the flat-top interleavers.

Figure 7:
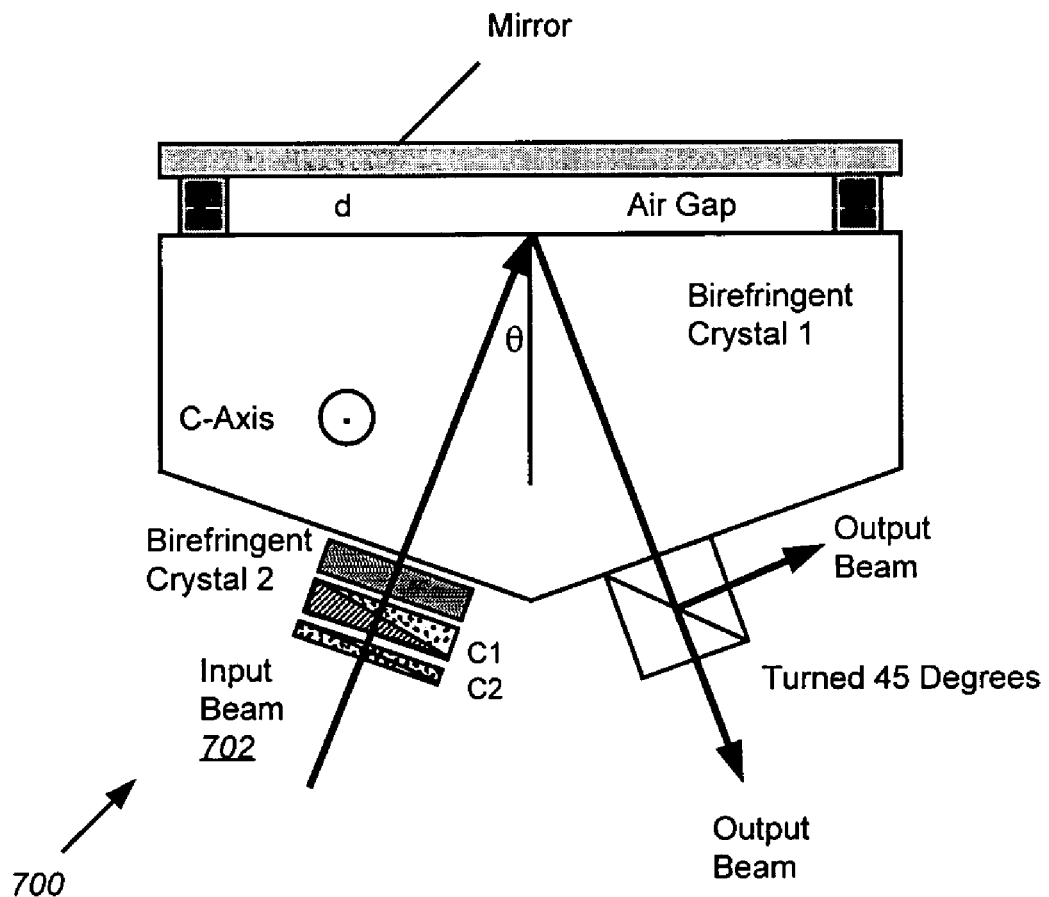
FIG. 7 is a block diagram illustrating an athermal birefringent interleaver with flat-top passbands utilizing two crystals with different thermo-optical properties according to an embodiment of the present invention.

By using two crystals for athermal operation, the birefringent interleaver becomes independent of the temperature. FIG. 7 shows a schematic drawing of an interleaver 700 according to one embodiment of the present invention.

The drawing shown in FIG. 7 is for an input beam 702 of polarized light. Prisms and polarizing beam splitters may be employed for operation with an input beam of unpolarized light (as shown in FIG. 2). Two Babinet compensators C1 and C2 made of crystal 1 and crystal 2, respectively, are used to compensate for the phase retardance of the two different birefringent crystals. Note that phase retardance is the phase difference between two modes of propagation inside a crystal plate. Babinet compensators are comprised of two wedges of crystals. By sliding the crystal wedges, variable retardance can be obtained.

The phase retardation for the structure shown in FIG. 6 can be written $$\Gamma = \frac{2\pi}{\lambda}(\Delta n_1 L_1 + \Delta n_2 L_2), \quad (9)$$

where $L_1$ and $L_2$ are the physical path lengths inside the crystals, $\lambda$ is the wavelength of the light beam, and $\Delta n_1$ and $\Delta n_2$ are the birefringence of the crystals. For most optical crystals, both birefringence and the length change with the temperature. Thus Equation (9) can be written as $$\Gamma = \frac{2\pi}{\lambda}(\Delta n_{10} L_1 + \Delta n_{20} L_2) + \quad (10)$$

$$\frac{2\pi}{\lambda}(\Delta n_{11} L_1 + \alpha_1 \Delta n_{10} L_1 + \Delta n_{21} L_2 + \alpha_2 \Delta n_{20} L_2)(T - T_0),$$

where T is the operating temperature, $T_0$ is a reference temperature, $\alpha_1$ and $\alpha_2$ are thermal expansion coefficients along the beam path, $\Delta n_{10}$ and $\Delta n_{20}$ are the birefringences at the reference temperature, and $\Delta n_{11}$ and $\Delta n_{21}$ are the first-order temperature derivatives of the birefringences.

Note that the second term in Equation (10) is proportional to the temperature deviation from the reference temperature. By a proper choice of the orientation of the second crystal relative to the first crystal, and a proper choice of the ratio of the crystal lengths, in embodiments of the present invention it is possible to cancel the thermal effect. In Equations (9) and (10), it is assumed that the c-axis of both crystals are parallel. This is useful when $\alpha_1 \Delta n_{10}$ and $\alpha_2 \Delta n_{20}$ are of opposite sign. In the event when $\alpha_1 \Delta n_{10}$ and $\alpha_2 \Delta n_{20}$ are of the same sign, then the c-axis of the second crystal must be rotated by 90 degrees. This leads to a change of sign of $\Delta n_{20}$ and the possibility of canceling the temperature dependent terms. Thus the proper orientation of the c-axes ensures that the second term in Equation (10) can be tuned to zero with a correct choice of the thicknesses $L_1$ and $L_2$. In other words, it is possible to have a zero dependence on the temperature. The absolute lengths are then chosen to meet the channel spacing requirement.

Although the present invention has been fully described in connection with the accompanying drawings, it is to be noted that various changes and modifications will become apparent to those skilled in the art. Such changes and modifications are to be understood as being included within the scope of the present invention as defined by the appended claims.

What is claimed is:

1. An optical interleaver, comprising:
   a first birefringent crystal having a first surface for receiving a light beam in a direction perpendicular to the first surface, a second surface for allowing the light beam to exit the first birefringent crystal perpendicular to the second surface, and a third surface which acts as a front mirror for reflecting the light beam at an angle θ with respect to a line perpendicular to the third surface;
   a back mirror positioned a distance d from the front mirror for reflecting the light beam;
   a spacer region formed between the front and back mirrors; and
   a polarization beam splitter (PBS) adjacent to the second surface for splitting the light beam,
   wherein a flat-top passband transmission function is induced on the light beam.

2. The optical interleaver as recited in claim 1, wherein the distance d is set to generate two interleaved signals with a desired channel spacing.

3. The optical interleaver as recited in claim 2, wherein the angle θ mis set about a Brewster angle to create a first mirror reflectivity of about 2–10% and a second mirror reflectivity of about 30–60%.

4. The optical interleaver as recited in claim 3, wherein the first birefringent crystal is sized such that the light beam will travel a distance L through the first birefringent crystal and satisfy the equation $\Delta nL = d \cos\theta$, where $\Delta n$ is the birefringence of the first birefringent crystal.

5. The optical interleaver as recited in claim 1, wherein the PBS is oriented at about 45 degrees with respect to a c-axis of the first birefringent crystal, the c-axis of the first birefringent crystal being perpendicular to a plane of incidence through which the light beam will pass.

6. An optical interleaver, comprising:
   a first polarization beam splitter (PBS) for receiving and reflecting an incident light beam and for generating a second output signal;
   a second PBS oriented with respect to the first PBS in a plane of incidence through which the incident and reflected incident light beams will pass for reflecting the reflected incident light beam;
   a birefringent crystal adjacent to the first and second PBSs and having a first surface for receiving the incident light beam and the reflected incident light beam, and a second surface which acts as a front mirror for reflecting the incident and reflected incident light beams in a direction perpendicular to the second surface;
   a back mirror positioned a distance d from the front mirror for reflecting the incident and reflected incident light beams;
   a spacer region formed between the front and back mirrors;
   first and second mirrors oriented in the plane of incidence through which the incident and reflected incident light beams will pass for reflecting the reflected incident light beams; and
   a third PBS oriented in the plane of incidence through which the light beam will pass for receiving the reflected incident light beams and generating a first output signal;
   wherein the front mirror is coated with two different anisotropic coatings such that the front and back mirrors and the spacer region form a dual Gires-Tournois Interferometer (GTI) for providing reflectivities needed for flat-top performance.

7. The optical interleaver as recited in claim 6, wherein the reflectivities include a first reflectivity of about 4–6% and a second reflectivity of about 30–50%.

8. A method for optical interleaving, comprising:
   receiving a light beam in a first birefringent crystal in a direction perpendicular to a first surface of the first birefringent crystal;
   reflecting the light beam off of a spectrally dispersive mirror at an angle θ with respect to a line perpendicular to the spectrally dispersive mirror, the spectrally dispersive mirror comprising a third surface of the first birefringent crystal acting as a front mirror and a back mirror at a distance d from the third surface, the front and back mirrors sandwiching a spacer region;
   passing the light beam out of the first birefringent crystal in a direction perpendicular to a second surface of the first birefringent crystal; and
   splitting the light beam passed out of the birefringent crystal,
   wherein a flat-top passband transmission function is induced on the light beam.

9. The method as recited in claim 8, further comprising selecting the distance d to generate two interleaved signals with a desired channel spacing.

10. The method as recited in claim 9, further comprising selecting the angle θ at about a Brewster angle to create a first mirror reflectivity of about 2–10% and a second mirror reflectivity of about 30–60%.

11. The method as recited in claim 10, further comprising sizing the first birefringent crystal such that the light beam wilt travel a distance L through the first birefringent crystal and satisfy the equation $\Delta nL = d \cos\theta$, where $\Delta n$ is the birefringence of the first birefringent crystal.

12. The method as recited in claim 8, further comprising splitting the light beam using a polarization beam splitter (PBS) oriented at about 45 degrees with respect to a c-axis of the first birefringent crystal, the c-axis of the first birefringent crystal being perpendicular to a plane of incidence through which the light beam will pass.

13. A method for optical interleaving, comprising:

receiving and reflecting an incident light beam and for generating a second output signal using a first polarization beam splitter (PBS);

reflecting the reflected incident light beam using a second PBS;

receiving the incident light beam and the reflected incident light beam into a first surface of a birefringent crystal adjacent to the first and second PBSs, and reflecting the incident and reflected incident light beams using a second surface which acts as a front mirror in a direction perpendicular to the second surface;

reflecting the incident and reflected incident light beams using a back mirror positioned a distance d from the front mirror and forming a spacer region between the front and back mirrors;

coating the front mirror with two different anisotropic coatings such that the front and back mirrors and the spacer region form a dual Gires-Tournois Interferometer (GTI) for providing reflectivities needed for flat-top performance, reflecting the reflected incident light beams using first and second mirrors oriented in the plane of incidence through which the incident and reflected incident light beams will pass; and receiving the reflected incident light beams and generating a first output signal using a third PBS oriented in the plane of incidence through which the light beam will pass.

14. The method as recited in claim 13, wherein the reflectivities include a first reflectivity of about 4–6% and a second reflectivity of about 30–50%.

* * * * *